United States Patent [19]

McLaughlin et al.

[11] Patent Number: 4,958,270
[45] Date of Patent: Sep. 18, 1990

[54] METHOD FOR CONTROL DATA BASE UPDATING OF A REDUNDANT PROCESSOR IN A PROCESS CONTROL SYSTEM

[75] Inventors: Paul F. McLaughlin, Hatfield; Pankaj H. Mody, Horsham, both of Pa.

[73] Assignee: Honeywell Inc., Minneapolis, Minn.

[21] Appl. No.: 299,859

[22] Filed: Jan. 23, 1989

[51] Int. Cl.$^5$ .............................................. G06F 11/20
[52] U.S. Cl. ...................................... 364/187; 371/9.1
[58] Field of Search ........................... 364/187; 371/9.1

[56] References Cited

U.S. PATENT DOCUMENTS

| 4,031,372 | 6/1977 | Davis | 371/9.1 |
| 4,351,023 | 9/1982 | Richer | 371/9.1 |
| 4,581,701 | 4/1986 | Hess et al. | 371/9.1 |
| 4,751,702 | 6/1988 | Beier et al. | 371/9.1 |

FOREIGN PATENT DOCUMENTS 2032149 4/1980 United Kingdom ................. 371/9.1

Primary Examiner—Allen MacDonald
Attorney, Agent, or Firm—Arthur A. Sapelli; D. J. Lenkszus; A. Medved

[57] ABSTRACT

A process control system includes a process controller which has a first and second controller, one of the controllers being designated as a primary controller and the other controller being designated as a secondary controller. Each controller has a respective data base. The primary controller performs predefined control functions of the process control system which includes updating the data base associated with the primary controller as a result of performing the predefined control functions. A method for updating the data base associated with the secondary controller comprises the steps of performing the control functions. Results therefrom are utilized to update the data base associated with the primary controller. Simultaneously with updating the data base, predetermined information being stored in the primary data base is collected. At the completion of performing the control functions, the predetermined information which was collected is transferred to the secondary controller.

8 Claims, 3 Drawing Sheets

METHOD FOR CONTROL DATA BASE UPDATING OF A REDUNDANT PROCESSOR IN A PROCESS CONTROL SYSTEM

RELATED PATENT APPLICATION

The present patent application is related to U.S. Patent Application, Ser. No. 07/299,857, entitled "APPARATUS FOR TRACKING PREDETERMINED DATA FOR UPDATING A SECONDARY DATA BASE", by P. Gerhart, filed on even date herewith, and assigned to Honeywell Inc., the assignee of the present application.

BACKGROUND OF THE INVENTION

This invention relates to a method for maintaining consistency between a primary data base and a secondary image of the data base of a one on one redundant processor in a process control system, and more particularly, to a method for tracking changes to a primary data base and effecting a change to a secondary data base such that only predetermined areas changed are updated thereby achieving an increase in efficiency to perform the update function.

Process Control Systems with backup process controllers such as described and claimed in U.S. Pat. No. 4,133,027, issued to J. A. Hogan on Jan. 2, 1979, and U.S. Pat. No. 4,141,066, issued to Y. Keiles on Feb. 20, 1979, include a backup controller having a dedicated Random Access Memory (RAM) and a dedicated Read-Only Memory (ROM). The back-up controller is essentially idle or can be doing some background tasks, but not tasks relating directly to the process control function. Upon detection of a failure of one of the primary process controllers, the data stored in the RAM of the failed controller must be transferred to the RAM of the backup controller to perform the operations of the primary controller. These systems describe a 1:N redundancy system.

In the present invention there is provided a method, in a 1:1 redundancy system, whereby the data base of a secondary device (ie., secondary or backup controller) is updated periodically such that the updating process is transparent to the primary functions and does not tie-up (or penalize) CPU or processor performance and utilizes a minimum amount of time. The method of the present invention updates only the information which was changed, resulting in a more efficient use of the CPU or microprocessor, and allows the updating process to be performed more frequently, on a real-time basis, and makes it practical to track large quantities of data so that control dynamics are not affected on a failover. Thus, when a failover condition occurs, the time to get the secondary controller to take over for a failed primary controller is substantially reduced as well as being less of an impact to the process under control.

SUMMARY OF THE INVENTION

Therefore, there is provided by the present invention, a method for controlling the maintenance (ie. updating) of a data base in a redundant controller of a process control system. A process control system includes a process controller which has a first and second controller, one of the controllers being designated as a primary controller and the other controller being designated as a secondary controller. Each controller has an image of the data base, wherein the primary controller acts upon and updates the data base, and the secondary controller maintains an equivalent image of the data base. The primary controller performs predefined control functions of the process control system which includes updating the data base associated with the primary controller as a result of performing the predefined control functions. A method of the present invention for updating the data base associated with the primary controller comprises the steps of performing the control functions. Changes therefrom are utilized to update the data base associated with the secondary controller. Simultaneously with updating the data base, predetermined information being stored in the primary data base is collected. At the completion of performing the control functions, the predetermined information is transferred to the secondary controller, thereby updating the data base of the secondary controller.

Accordingly, it is an object of the present invention to provide a method for maintaining the data base of a redundant controller of a process control system.

It is another object of the present invention to provide a method for maintaining the data base of a redundant controller wherein only predetermined changes are updated.

It is still another object of the present invention to provide a method for maintaining the data base of a redundant controller of a process control system without significantly impacting CPU or microprocessor performance in the primary controller.

These and other objects of the present invention will become more apparent when taken in conjunction with the following description and attached drawings, wherein like characters indicate like parts, and which drawings form a part of the present application.

DETAILED DESCRIPTION

Figure 1:
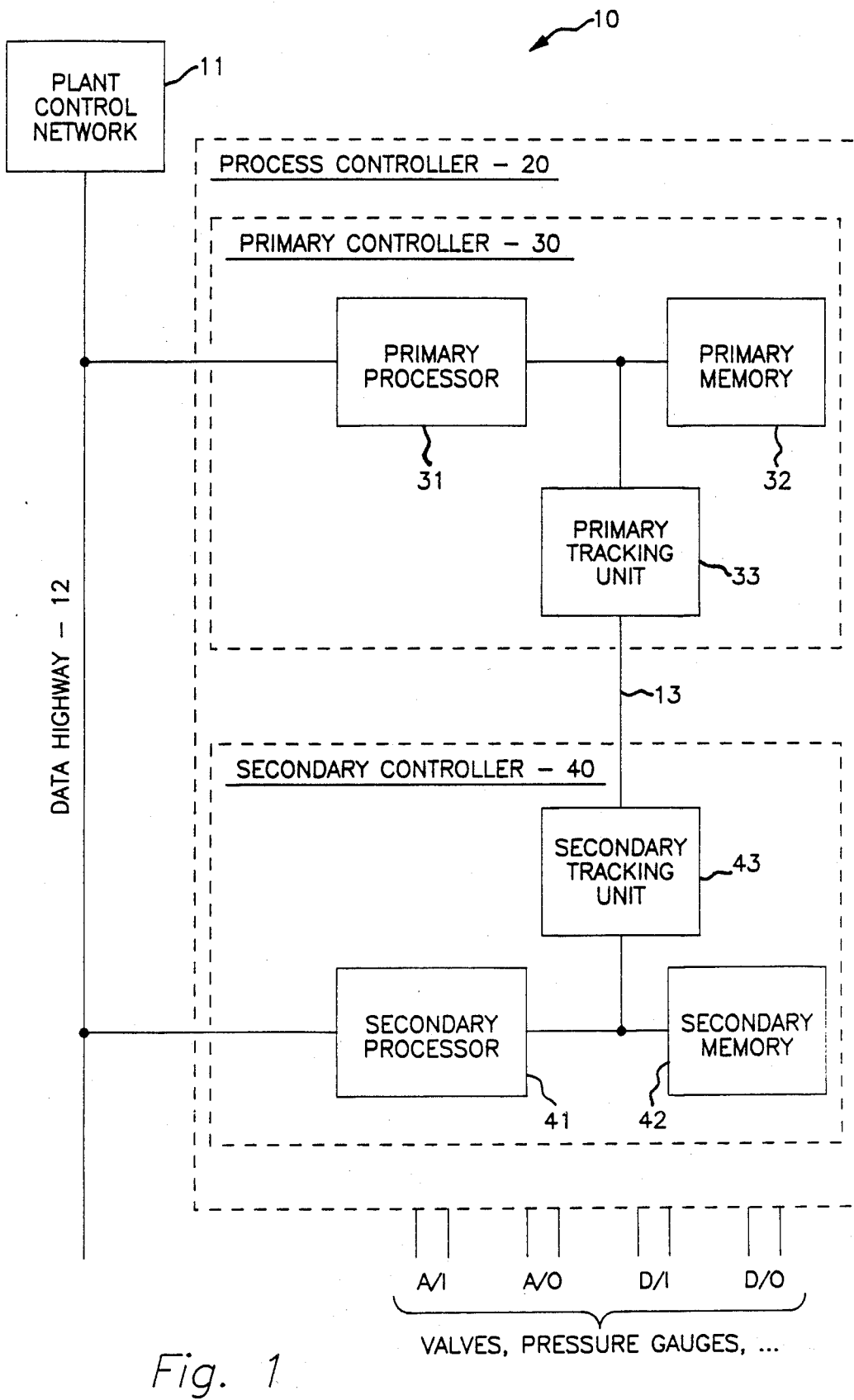
FIG. 1 shows a block diagram of a process control system having a redundant controller.

Referring to FIG. 1, there is shown a block diagram of a process control system 10 having redundant controllers which utilizes the method of the present invention, and more specifically there is shown a functional block diagram of a redundant process controller 20 which includes a primary controller 30 and a secondary controller 40. Although in the description which follows and the identification given to the controllers, the primary controller 30 and the secondary controller 40, the controllers are bidirectional with respect to redundancy, meaning that either of the redundant (or sometimes referred to herein as secondary) controllers can operate fully as a primary or secondary. The labels identified herein as primary and secondary are done strictly for purposes of identification and explanation.

The process control system 10 includes a plant control network 11 and connected thereto is a data highway 12 which permits multiple process controllers to be attached to the data highway 12. The primary controller 30 includes a primary processor 31, a primary memory 32, and a primary tracking unit 33. The secondary controller 40 includes a secondary processor 41, a secondary memory 42, and a secondary tracking unit 43. The primary processor 31 and the secondary processor 41 are each connected to the data highway 12. Primary processor 31 is connected to its primary memory 32 and its primary tracking unit 33. The secondary processor 41 is connected to its secondary memory 42 and its secondary tracking unit 43. Coupled to the process controller 20 are various inputs and outputs including analog inputs (A/I), analog outputs (A/0), digital inputs (D/I), and digital outputs (D/0), these inputs and outputs being connected to various valves, pressure switches, pressure gauges, thermocouples, . . . which are used to indicate the current information or status and to control the process of the process control system. The plant control network 11 can be of the type described in U.S. Pat. No. 4,607,256 issued to R. A. Henzel on Aug. 19, 1986, and assigned to the same assignee as the present application. Although not shown, it is understood that the various. analog and digital inputs and outputs are connected via appropriate interface apparatus to the primary processor 31 and the secondary processor 41.

Within the process controller 20, the determination of which controller 30, 40 is to be the primary or secondary, is determined by a download control personality (ie., operating software and data base information) from the plant control network 11. At that time the first controller loaded 30, 40 will be the primary controller and the other will take the role of the secondary controller 40, the controllers 30, 40 of the process controller 20 having already being identified as the primary controller 30 and the secondary controller 40 in the FIG. 1, for purposes of description and example; however, it will be understood that the primary controller could have been the controller 40 and the secondary controller could just as well have been the controller 30. Having thus established the primary/secondary roles of the controllers 30, 40, the primary controller 30 performs the control processing algorithms, which include reading the input data from the valves, pressure gauges, . . . , performing predetermined calculations and outputting the results. The data is also stored in the primary memory 32. There is an area of the primary memory 32 that is designated as tracked memory (or tracked RAM). A write to this area, ie. the tracked RAM will be shadowed by the primary tracking unit 33. The primary tracking unit 33 stores predetermined data simultaneously with the writing of tracked RAM into its own internal storage unit (not shown) in a predetermined format, denoted herein as packets. Upon completion of its processing function for a given time interval, the primary processor 31 transmits control signals to the primary tracking unit 33 thereby initiating transfer of the data stored within the primary tracking unit 33 to the secondary tracking unit 43. Some control information is also transferred by the primary processor 31 to provide for secure transfer, ie., header information, byte count, data type, . . . . The secondary processor 41 then takes the data stored in the secondary tracking unit 43 and generates the required information from the information packets stored in the secondary tracking unit 43, and updates the secondary memory 42. The secondary processor 41 accepts these packets, performs integrity tests and communicates the results of these tests back to the primary processor 31, extracts the data value, and calculates the address to store the data value in the address identified within the information packet of the secondary memory 42. By performing the update of the secondary memory in this fashion, the performance penalty in the primary processor 31 is greatly reduced thereby increasing the control processing capacity (sometimes referred to herein as bandwidth) of the primary processor 31. A further advantage of this method is that all the control data is automatically tracked, resulting in more robust control and in significantly reduced chances of software errors. The CPU utilized in processor 31, 41, in the preferred embodiment is of the type Motorola 68000.

Figure 2:
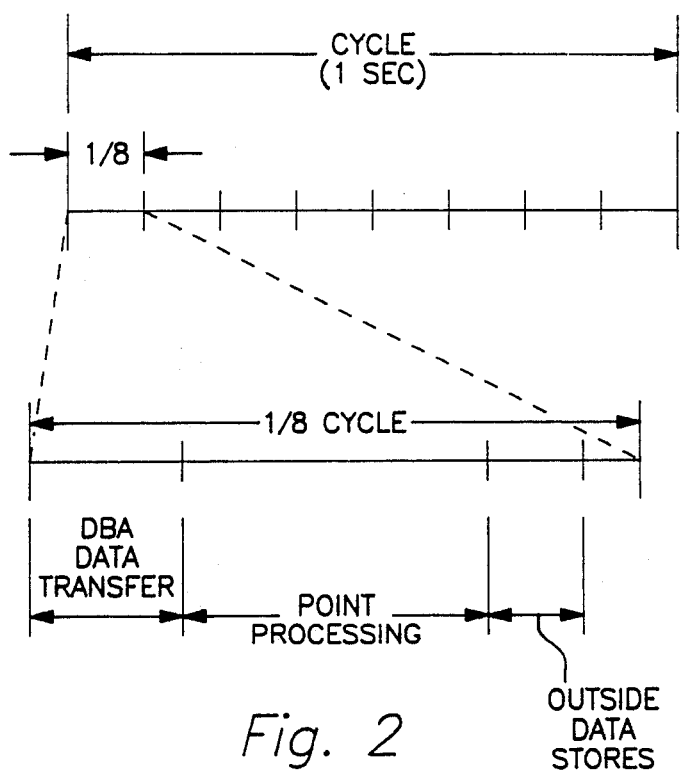
FIG. 2 shows a time allocation which defines a cycle of the controller.

Referring to FIG. 2 there is shown an allocation of time utilized by the primary processor 31. In the preferred embodiment of the present invention, a cycle is defined as a time period of one second and is divided into eight subcycles. Each subcycle, the processor performs the predetermined algorithms as mentioned above (referred to in FIG. 2 as point processing). The time required for the point processing is less than the time of the subcycle. Before starting the point processing, the primary processor 31 initiates the transfer of the tracked data to the secondary controller 40 (denoted in the figure as DBA data transfer). From this time frame diagram, it can readily be seen that the data contained in the data base of the secondary controller 40 is one step (ie., subcycle) behind the data contained in the data base of the primary controller 30. Thus, while the primary is performing control action (ie., point processing) for sub-cycle n, the secondary is updating its data base with changes incurred in sub-cycle N-1. (In systems where every write to the primary memory gets written to the secondary memory, then the primary and secondary will retain the same data base. However, if an error were to occur, ie., a failure during the transmission the partial byte then both the primary and secondary would have partial byte data, ie.,, the same incomplete data.) In the present invention, as has been mentioned before, the secondary data base will have complete data but is one step behind that of the primary. Other functions can be performed within the time of the sub-cycle. In the preferred embodiment, outside data stores from other nodes on the network is also performed, but will not be discussed further herein since it forms no part of the present invention.

Figure 3:
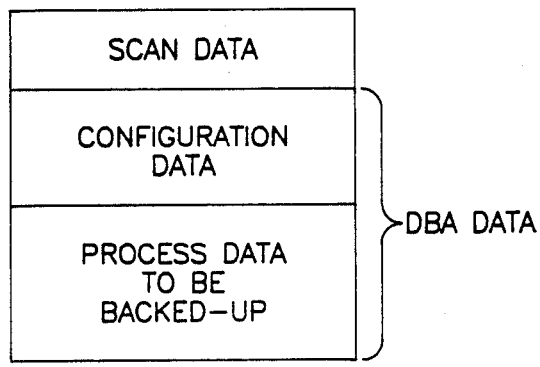
FIG. 3 shows a partial memory map of the primary memory of the controller of the preferred embodiment of the present invention.

Referring to FIG. 3 there is shown a partial memory map of the primary memory 32. Included is the scan data which contains the actual value of the I/0 as read from the valves, pressure gauges, . . . . The section marked configuration data includes information indicating the options which were selected, how points are configured, what algorithms are running, and the like. The section indicating process data to be backed up includes the results of the algorithms. Also included is information to indicate various functions going on such as various timers which are set, various alarms which are set, . . . . The area of memory mark DBA Data is the area of primary memory 32 (ie., RAM) that is designated "tracked memory." A write to this area of primary memory 32 will be collected (or also referred to herein as shadowed or captured) by the primary tracking unit 33. The data collected by the primary tracking unit 33 is formatted in a predefined packet.

Figure 4:
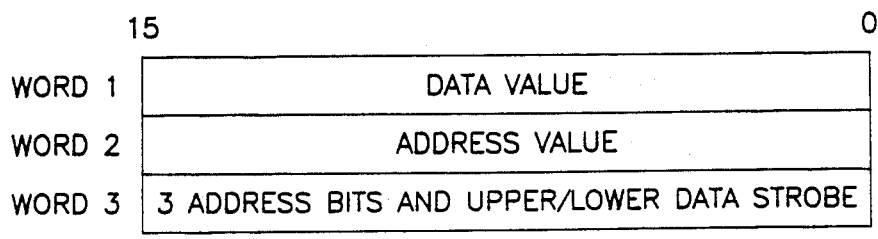
FIG. 4 shows the packet format of the captured data in the preferred embodiment of the present invention.

Referring to FIG. 4, there is shown the format of the packet generated by the primary tracking unit 33 in the preferred embodiment of the present invention. The upper and lower data strobe values indicate the value of the least significant address bit, and the most significant five address bits can be assumed (ie., known implicitly) due to the layout of the tracked memory. The tracked memory packet is built for every write (byte or word) to the tracked memory but only while memory tracking is requested. An important feature of the primary tracking unit 33 is that there is essentially no performance penalty in writing to the tracked memory, as discussed above.

Tracked data packets are stored in a memory store unit (not shown) of the primary tracking unit 33. The three word packets are not stored sequentially, but in column format. The primary tracking unit stores the packets based on a counter (not shown) of the primary tracking unit 33, which is incremented by one whenever a packet is stored. This counter is readable by the primary processor 31 in order to ascertain the quantity of data to be transferred. The primary tracking unit 33 is more fully described in co-pending application, Ser. No. 07/299,857, entitled "APPARATUS FOR TRACKING PREDETERMINED DATA FOR UPDATING A SECONDARY DATA BASE," filed on even date herewith, and assigned to the same assignee as the present application.

Figure 5:
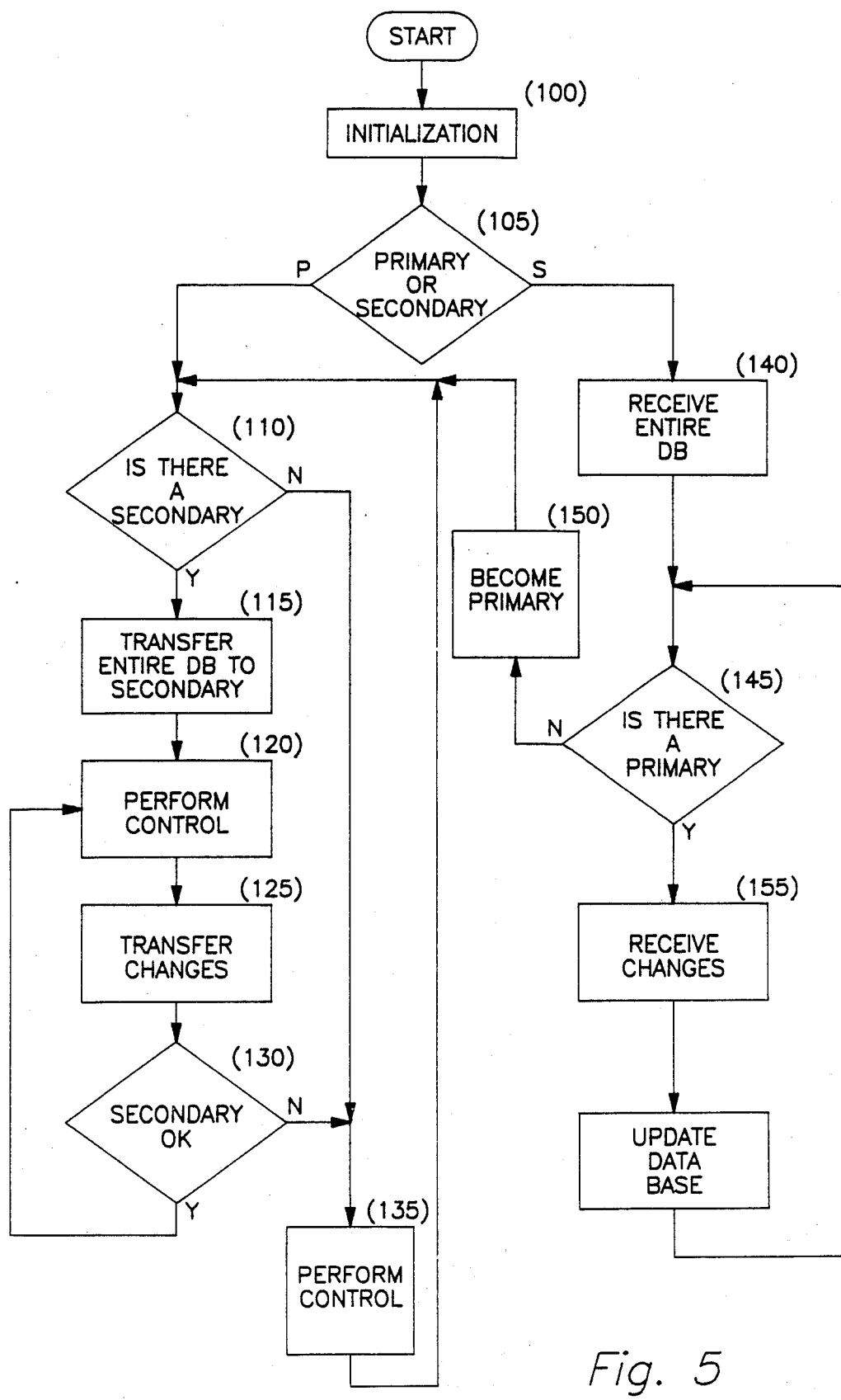
FIG. 5 shows a flow diagram of the software of both the primary and secondary controllers which implements the method of the present invention.

Referring to FIG. 5 there is shown a flow diagram of the software of both the primary and the secondary controllers 30, 40 which implements the method of the present invention. Upon starting the operation of the software, each processor performs the required initialization, which may include diagnostic tests, self tests, zeroing various buffers and memory locations . . . (block 100). Each processor then determines whether the processor is operating as a primary or secondary processor. This determination is made at the time the controller has its personality image downloaded. The decision is based on the presence of a primary (block 105). If the processor determines it is to operate as a primary processor then this controller will periodically test for the existence of an operationally loaded secondary as part of the primary's normal functions (block 110). When the secondary is detected, the entire data base is transferred to the secondary processor (block 115), and the primary processor 31 then proceeds to perform the control operation (block 120). The perform control function includes the entire control function, ie., everything related to control. This includes obtaining inputs, doing the output function, doing the point processing, process the changes coming in from the data highway 12, outputting required predetermined information to the plant control network 11 via the data highway 12, updating its internal data base, . . . . The perform control function is performed during the subcycle indicated as point processing discussed in conjunction with FIG. 2 above. When the perform control function has been completed, the changes to the data base are then transferred to the secondary. The change data is predetermined and denoted DBA data (block 125). In the protocol of the present invention the secondary responds to the primary that all the data has been received and that no errors were detected in addition to performing other functions which indicates to the primary that the secondary is operating correctly. This function corresponds to the determination of whether the secondary is functioning properly (block 130). If the secondary is performing properly without any errors, the process returns to the performed control function (block 120). In a normal situation without any errors and with a secondary operational, the loop consisting of block 120, 125, and 130, are continuously operating each subcycle. If an error of the primary is detected by the secondary, a failover condition will occur in which the secondary controller 40 becomes the primary, and the primary controller 30 is taken off-line. The processing of the secondary controller 40 (which is now the primary controller) performs the control function block 135 and then returns to block 110. If the former primary controller 30 is still off-line, the response to the decision in block 110 of whether there is a secondary will be no, and the loop comprising blocks 135 and 110 will be performed continuously until such time as the former primary controller 30 is made operational. Because either controller 30, 40 may operate as the primary controller, switchback to the old primary when it has been restored is neither required or desired in the preferred embodiment of the present invention.

After the initial start and initialization, when the controller determines it is to operate as the secondary controller (block 105), the secondary controller sets up to receive the entire data block which will be transmitted from the primary (block 140) the entire data block including the scan data and configuration data which includes the personality images specified by the plant control network 11. In order to help effect the failover the secondary controller tests whether there is a primary operational (block 145). If no primary is operational, then the secondary controller assumes a primary state or mode (block 150), becomes the primary controller and the processing continues at block 110. If a primary controller is operational, the controller operating as a secondary controller sets up to receive, and receives the changes to the data base which are transferred by the primary as a result of the transfer changes (block 125) function of the primary controller (block 155). After the changes are received, the processor acting as a secondary processor acts to store the data just received in the data base of the secondary processor by interpreting the data packets in the secondary tracking unit and writing the new values contained in these packets in the secondary memory 42, ie., secondary data base. An indication is made by the secondary processor to the primary processor when the secondary processor has completed processing all the data packets (eg., sets a flag). The primary processor tests the flag to determine if the secondary has completed its processing. If the primary processor requests a new transfer while the previously transferred data is still being stored by the secondary, the secondary can respond by requesting the primary to pause its request. Thus as mentioned above, the secondary processor interpreting and storing the data packets of sub-cycle N-1 received from the primary processing occurs in a subcycle N while the primary is performing segment N, ie., the data stored in the data base of the secondary processor is lagging the data within the data base of the primary processor by one subcycle, as discussed above. The secondary processor then sets up to receive data. The secondary processor is essentially in a standby mode, ie., performing various background task, such as diagnostics to monitor its own readiness.

The primary and secondary controllers 30, 40 can communicate to each other via three mediums, the data highway 12, the link 13 between the primary and the secondary tracking units 33, 43, and the I/0 link (not shown, this link is the path to which the primary processor 31 and the secondary process 41 are connected in order to interface with the A/I, A/0, D/I, and D/0). Via these communication paths, the primary controller 30 can ensure that the secondary controller 40 is present and operational, and the secondary controller can test that the primary controller is operational in order to determine when it (ie., the controller designated as the secondary) is to assume the primary status (or mode).

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

We claim:

1. In a process control system having a process controller, said process controller including a first and second controller, one of said controllers being designated as a primary controller and the other being designated as a secondary controller, each controller having a corresponding image of a data base, and wherein the primary controller is performing predefined control functions of the process control system, a method for updating the data base associated with the secondary controller comprising the steps of:
   (a) performing a predefined control function;
   (b) updating the data base associated with the primary controller as a result of performing the predefined control function;
   (c) capturing predetermined information being stored in the primary data base simultaneously with the step of updating;
   (d) repeating steps (a) through (c) until all the predefined control functions have been performed; and
   (e) transferring the predetermined information captured in step (c) to the secondary controller.

2. A method for updating the data base associated with the secondary controller according to claim 1 further comprising the steps of: (after step (e), starting at step (a) to repeat the process at the start of the next subcycle.

3. A method for updating the data base associated with the secondary controller according to claim 2, wherein the step of starting at step (a), comprises the steps of:
   (a) verifying that the secondary controller is still functional; and
   (b) if the secondary controller is still functional;
      (i) starting at step (a) to repeat the process at the start of the next subcycle; otherwise
      (ii) entering a new loop which performs the predefined control function, and checks if the secondary controller is functional.

4. A method for updating the data base associated with the secondary controller according to claim 3, wherein the step of collecting predetermined information comprises the steps of:
   (a) capturing predetermined information being stored in the primary data base;
   (b) formatting the captured predetermined information into packets having a predefined format; and
   (c) storing the information packets into a temporary, predetermined storage element.

5. A method for updating the data base associated with the secondary controller according to claim 4, wherein, in said secondary controller, said method further comprises the step of: receiving the predetermined information.

6. A method for updating the data base associated with the secondary controller according to claim 5, wherein the step of receiving the predetermined information comprises the steps of:
   (a) accepting the predetermined information;
   (b) performing integrity tests on the predetermined information accepted;
   (c) extracting the data value from the predetermined information received;
   (d) calculating the address to store the data value; and
   (e) updating the data base associated with the secondary controller.

7. A method for updating the data base associated with the secondary controller according to claim 6, wherein the steps of extracting the data value, calculating the address, and updating the data base associated with the secondary controller, occur during a sub-cycle N on data which was derived by the primary controller during a sub-cycle N-1.

8. In a process control system having a process controller, said process controller including a first and second controller, one of said controllers being designated as a primary controller and the other being designated as a secondary controller, each controller having a corresponding image of a data base, and wherein the primary controller is performing predefined control functions of the process control system which includes updating the data base associated with the primary controller as a result of performing the predefined control functions, a method for updating the data base associated with the secondary controller comprising the steps of:
   (A) in said primary controller:
      (a) performing the control functions;
      (b) updating the data base associated with the primary controller;
      (c) capturing predetermined information being stored in the primary data base simultaneously with the step of updating;
      (d) formatting the captured predetermined information into packets having a predefined format;
      (e) storing the information packets into a temporary, predetermined storage element;
      (f) at the completion of the steps of performing and updating, transferring the predetermined information to the secondary controller;
      (g) verifying that the secondary controller is still functional; and
   (B) in said secondary controller:
      (a) accepting the predetermined information;
      (b) performing integrity tests on the predetermined information accepted;
      (c) extracting the data value from the predetermined information;
      (d) calculating the address to store the data value; and
      (e) updating the data base associated with the secondary controller.

* * * * *